US010951962B2

(12) United States Patent
Teichmann (10) Patent No.: US 10,951,962 B2
(45) Date of Patent: Mar. 16, 2021

(54) DATA TRANSFER FACILITATION TO AND ACROSS A DISTRIBUTED MESH NETWORK USING A HYBRID TV WHITE SPACE, WI-FI AND ADVANCED METERING INFRASTRUCTURE CONSTRUCT

(71) Applicant: Delta Energy & Communications, Inc., Murrieta, CA (US)

(72) Inventor: Keith Teichmann, Newton Centre, MA (US)

(73) Assignee: DELTA ENERGY & COMMUNICATIONS, INC., Murrieta, CA (US)

( * ) Notice: Subject to any disclaimer, the term of this patent is extended or adjusted under 35 U.S.C. 154(b) by 0 days.

(21) Appl. No.: 16/372,911

(22) Filed: Apr. 2, 2019

(65) Prior Publication Data

US 2019/0268676 A1    Aug. 29, 2019

Related U.S. Application Data

(63) Continuation-in-part of application No. 15/160,754, filed on May 20, 2016.
(Continued)

(51) Int. Cl.
*H04Q 9/00* (2006.01)
*H04B 1/16* (2006.01)
*H04W 84/12* (2009.01)

(52) U.S. Cl.
CPC ............ *H04Q 9/00* (2013.01); *H04B 1/16* (2013.01); *H04Q 2209/43* (2013.01); *H04W 84/12* (2013.01)

(58) Field of Classification Search
CPC ........ H04Q 9/00; H04Q 2209/43; H04B 1/16; H04W 84/12
See application file for complete search history.

(56) References Cited

U.S. PATENT DOCUMENTS 7,379,981 B2   5/2008  Elliott et al.
8,102,148 B2   1/2012  Hershey et al.
(Continued)

FOREIGN PATENT DOCUMENTS

KR    20130108769 A  * 10/2013  ............... H04Q 9/00
KR    20130108769 A    10/2013

OTHER PUBLICATIONS

Snyder, A.F., et al., "The ANSI C12 protocol suite—updated and now with network capabilities", Mar. 2007 (available at http://horizontec.com/sccsmartgrid.2yt4/2007-03ClemsonPSCO2-snyder-mtgstuber.pdf) (6 pages).
(Continued)

*Primary Examiner* — Amine Benlagsir
(74) *Attorney, Agent, or Firm* — Ware, Fressola, Maguire & Barber LLP (57) ABSTRACT

An apparatus and system are provided that provide advanced metering infrastructure and transformer monitoring operations in a smart grid and a wireless mesh network with a television white space (TVWS) backhaul to provide Internet connectivity to consumer devices. A transformer monitoring device receives signaling comprising utility usage data from one or more smart meters in a smart grid, monitors the transmission of electricity from a transformer to the buildings in the smart grid, and establishes a wireless mesh network to provide Internet connectivity to the one or more smart meters and to user devices. The apparatus receives a TVWS signal from a broadcast source, and converts the TVWS signal to a radio frequency or Wi-Fi signal, for transmission to the one or more smart meters and/or user devices to establish the wireless mesh network with a TVWS backhaul.

14 Claims, 8 Drawing Sheets

Related U.S. Application Data (60) Provisional application No. 62/651,580, filed on Apr. 2, 2018, provisional application No. 62/203,101, filed on Aug. 10, 2015.

(56) References Cited

U.S. PATENT DOCUMENTS

| | | |
|---|---|---|
| 8,111,157 B2 | 2/2012 | Diener et al. |
| 8,373,575 B2 | 2/2013 | Boettner et al. |
| 2002/0106018 A1 | 8/2002 | D'Luna et al. |
| 2004/0057491 A1 | 3/2004 | Stenestam |
| 2005/0088299 A1 | 4/2005 | Bandy et al. |
| 2007/0229295 A1 | 10/2007 | Curt et al. |
| 2008/0065342 A1* | 3/2008 | Zalitzky ............ H04B 3/46 |
| | | 702/108 |
| 2008/0106425 A1 | 5/2008 | Deaver et al. |
| 2008/0272934 A1 | 11/2008 | Wang et al. |
| 2009/0119068 A1 | 5/2009 | Ranting |
| 2009/0135836 A1 | 5/2009 | Veillette |
| 2009/0240449 A1 | 9/2009 | Gibala et al. |
| 2009/0256686 A1 | 10/2009 | Abbot et al. |
| 2009/0312881 A1 | 12/2009 | Venturini Cheim et al. |
| 2011/0026500 A1 | 2/2011 | Shaffer et al. |
| 2011/0095867 A1 | 4/2011 | Ahmad |
| 2011/0255417 A1 | 10/2011 | Mohan et al. |
| 2012/0058790 A1 | 3/2012 | Junnell et al. |
| 2012/0106394 A1 | 5/2012 | Apostolakis |
| 2012/0126790 A1 | 5/2012 | Sobotka et al. |
| 2012/0229296 A1 | 9/2012 | Ree |
| 2012/0286770 A1 | 11/2012 | Schroder et al. |
| 2012/0297481 A1 | 11/2012 | Boot et al. |
| 2013/0103660 A1 | 4/2013 | Welsh et al. |
| 2013/0106617 A1* | 5/2013 | Heo ............ H04Q 9/00 |
| | | 340/870.07 |
| 2013/0223334 A1 | 8/2013 | Guo et al. |
| 2013/0315057 A1 | 11/2013 | Popa et al. |
| 2013/0335062 A1 | 12/2013 | de Buda et al. |
| 2014/0189722 A1 | 7/2014 | Shetty |
| 2015/0095936 A1 | 4/2015 | Yu et al. |
| 2015/0288825 A1 | 10/2015 | Cook |
| 2016/0094879 A1 | 3/2016 | Gerszberg et al. |
| 2016/0198245 A1 | 7/2016 | Rhoads et al. |
| 2016/0205106 A1 | 7/2016 | Yacoub et al. |
| 2016/0337354 A1 | 11/2016 | Smadja et al. |
| 2018/0267494 A1 | 9/2018 | Meranda et al. |
| 2018/0366978 A1 | 12/2018 | Matan et al. |

OTHER PUBLICATIONS

Parag Kulkarni, et al., "A Mesh-Radio-Based Solution for Smart Metering Networks", IEEE Communications Magazine, Jul. 2012, 10 pages.

International Search Report and Written Opinion from PCT/US2019/025368, dated Jul. 23, 2019 (11 pages).

Carlson Wireless Technologies, "TV White Space—Breakthrough Technology", https://www.carlsonwireless.com/tv-white-space/, Mar. 2018.

Metz, Cade, "Facebook's Massive New Antennas Can Beam Internet for Miles," https://www.wired.com/2016/04/facebooks-massive-new-antennas-can-beam-internet-miles/, Apr. 13, 2016.

Choubey, Neeraj, et al., "Introducing Facebook's new terrestrial connectivity systems—Terragraph and Project ARIES—Facembook Engineering," https://engineering.fb.com/connectivity/introducing-facebook-s-new-terrestrial-connectivity-systems-terragraph-and-project-aries/, Apr. 13, 2016.

* cited by examiner

DATA TRANSFER FACILITATION TO AND ACROSS A DISTRIBUTED MESH NETWORK USING A HYBRID TV WHITE SPACE, WI-FI AND ADVANCED METERING INFRASTRUCTURE CONSTRUCT

CROSS-REFERENCE TO RELATED APPLICATIONS

The present application claims the benefit of U.S. Provisional Patent Application No. 62/651,580 filed Apr. 2, 2018, and is a continuation in part of U.S. patent application Ser. No. 15/160,754 filed on May 20, 2016, which claims the benefit of U.S. Provisional Patent Application No. 62/203,101 filed Aug. 10, 2015, and each of the foregoing is incorporated by reference in their entirety.

BACKGROUND OF THE INVENTION

1. Field of the Invention

The present invention relates to a system and device for conversion of a television white space ("TVWS") signal to facilitate data communication along a smart grid Wi-Fi network by application of TVWS to a fully realized Wi-Fi mesh network build-out.

2. Brief Description of Related Art

Data transmission infrastructure and corresponding access to Internet connectivity continue to plague those residing both within emerging market communities and developed region rural areas. In particular, approximately 3.8 billion people worldwide do not have internet access. Internet penetration within emerging markets lags that of developing countries by 241%. Within the US alone, it is calculated that approximately 60 million people are still without home broadband Internet access, many of those within rural communities. Recognizing these statistics, opportunities exist to solve these connectivity solutions through the pioneering application of new transmission technologies coupled with step changes in current Advanced Metering Infrastructure (AMI).

Television white space ("TVWS") defines the unused broadcasting frequencies existing between TV broadcast channels in both the VHF and UHF spectrum. These gaps are traditionally administered to allow buffering between channels to prevent interference. Within these gaps, the wireless spectrum approximates the capabilities of traditional 4G. In 2010, this underutilized spectrum was opened to unlicensed public use by the FCC, offering the potential to deliver broadband Internet connectivity directly to technically capable users.

SUMMARY OF THE INVENTION

The present application addresses these shortcomings in the art by providing a transformer monitoring device that performs the AMI operations in a smart utility grid, establishes a wireless mesh network within the smart grid that is accessible by various consumer devices to provide Internet connectivity, and converts a transmitted TVWS signal so that it can be applied as the backhaul for the wireless mesh network.

In accordance with a first aspect of the present application, an apparatus is provided, including a transformer monitoring device. The apparatus is configured to receive signaling comprising utility usage data from one or more smart meters in a smart grid network, including for example electricity usage data from one or more smart electricity meters associated with a building or residence in the smart grid network. The apparatus may be further configured to monitor the transmission of electricity from a transformer to the buildings in the smart grid network. The apparatus is further configured to establish a wireless mesh network in the smart grid network configured to provide Internet connectivity to the one or more smart meters and to user devices in the wireless mesh network not associated with the smart grid network. The apparatus is configured to receive a TVWS signal from a TVWS broadcast source or a collection point in communication with a TVWS broadcast source, and to convert the TVWS signal to an alternative signal format, such as to a Wi-Fi signal. The apparatus is further configured to transmit the converted signal to the one or more smart meters to establish the wireless mesh network and/or to the user devices or through the wireless mesh network to the user devices using the TVWS signal as a backhaul.

In certain embodiments, the apparatus comprises an antenna configured to receive the TVWS signal, and/or an input port configured to connect to a cable providing the TVWS signal. In further embodiments, the apparatus is further configured to transmit and receive signaling containing data from a cloud-based server relating to utility usage in the smart grid network and other data captured from non-utility devices in the smart grid network. In various other embodiments, the apparatus may be configured to be mounted to a transformer, a transformer pole, an underground transformer, a utility pole, a building or commercial structure, and/or an unmanned aerial vehicle. The apparatus may be further configured to transmit TVWS signaling to allow bi-directional communication using the TVWS signal as the backhaul.

In accordance with a first aspect of the present application, an apparatus is provided comprising a first receiver configured to receive television white space signaling from a source; a first circuit configured to convert the television white space signaling into a radio frequency signaling; a mesh networking chip set configured to establish a wireless mesh network comprising the apparatus and one or more devices; a first transmitter configured to transmit the radio frequency signaling to the one or more devices; a second receiver configured to receive further radio frequency signaling from at least one of the one or more devices; a second circuit configured to convert the further radio frequency signaling into further television white space signaling; and a second transmitter configured to transmit the further television white space signaling to the source. The further television white space signaling is a backhaul for the wireless mesh network.

In certain embodiments of the apparatus, the apparatus is further configured to monitor activities of a transformer arranged in a utility grid. The apparatus may be further configured to communicate with one or more utility meters associated with structures arranged in the utility grid, and to receive metered data relating to consumption of a utility from the one or more utility meters in the utility grid. The one or more utility meters may comprise one or more electric meters, the structures associated with the one or more electric meters receive electricity from the transformer, and the apparatus is configured to receive metered data relating to consumption of electricity. The one or more devices may include the one or more utility meters and the wireless mesh network is formed comprising the apparatus and the one or more utility meters. The first transmitter of the apparatus is configured to transmit the radio frequency signaling to the one or more utility meters for retransmission along the wireless mesh network to another device accessing the wireless mesh network. The second receiver is configured to receive the further radio frequency signaling originating from the another device and wherein the another device is or more of a computer, laptop, tablet computer, and a mobile phone or device, and the wireless mesh network provides Internet connectivity to the another device.

In accordance with certain embodiments of the apparatus, the first receiver and second transmitter comprise an antenna for wirelessly receiving the television white space signaling and transmitting the further television white space signaling. In additional or alternative embodiments of the apparatus, the first receiver and second transmitter comprise a connection port configured to receive a cable connected to the source for receiving the television white space signaling and transmitting the further television white space signaling.

In accordance with a second aspect of the present application, a system is provided, including a source configured to broadcast a television white space signaling and an apparatus comprising: a first receiver configured to receive the television white space signaling from the source; a first circuit configured to convert the television white space signaling into a radio frequency signaling; and a first transmitter configured to transmit the radio frequency signaling. The system further comprises one or more devices configured to receive the radio frequency signaling, and to transmit further radio frequency signaling to the apparatus. The apparatus further comprises: a mesh networking chip set configured to establish a wireless mesh network comprising the apparatus and the one or more devices; a second receiver configured to receive the further radio frequency signaling from at least one of the one or more devices; a second circuit configured to convert the further radio frequency signaling into further television white space signaling; and a second transmitter configured to transmit the further television white space signaling to the source. The further television white space signaling is a backhaul for the wireless mesh network.

In accordance with certain embodiments of the system, the system further comprises a transformer of a utility grid, and the apparatus is further configured to monitor activities of the transformer. The one or more devices of the system may comprise one or more utility meters associated with structures arranged in the utility grid configured to transmit metering data to the apparatus. The wireless mesh network is formed comprising the apparatus and the one or more utility meters, and the apparatus is a first node in the wireless mesh network and is configured to transmit the radio frequency signaling to the one or more utility meters serving as second or more nodes in the wireless mesh network for retransmission along the wireless mesh network to one or more other devices. The one or more other devices further comprise one or more of a computer, laptop, tablet computer, and a mobile phone or device, and the wireless mesh network provides Internet connectivity to the one or more other devices. The one or more other devices are configured to receive and transmit signaling that is independent from the utility grid through the wireless mesh network.

In accordance with embodiments of the system, the first receiver and second transmitter of the apparatus comprise an antenna for wirelessly receiving the television white space signaling and transmitting the further television white space signaling.

In accordance with additional embodiments of the system, the system further comprises a central collection node configured to receive the television white space signaling from the source and transmit the television white space signaling to the apparatus, and further configured to receive the further television white space signaling from the apparatus and transmit the further television white space signaling to the source. The first receiver and second transmitter comprise a connection port configured to receive a cable connected to the central collection node for receiving the television white space signaling and transmitting the further television white space signaling.

In embodiments of the system, the one or more devices comprise one or more of a computer, laptop, tablet computer, and a mobile phone or device, and the wireless mesh network provides Internet connectivity to the one or more devices.

In accordance with a third aspect of the present application, a method of operating an apparatus is provided comprising receiving television white space signaling from a source; converting the television white space signaling into a radio frequency signaling; establishing a wireless mesh network including the apparatus and one or more devices; transmitting the radio frequency signaling to the one or more devices; receiving further radio frequency signaling from at least one of the one or more devices; converting the further radio frequency signaling into further television white space signaling; and transmitting the further television white space signaling to the source. The further television white space signaling is a backhaul for the wireless mesh network.

In certain embodiments of the method, the method further comprises monitoring, by the apparatus, activities of a transformer arranged in a utility grid. The method may further comprise communicating, by the apparatus, with one or more utility meters associated with structures arranged in the utility grid, and receiving metered data relating to consumption of a utility from the one or more utility meters in the utility grid. The one or more utility meters may comprise one or more electric meters, the structures associated with the one or more electric meters receive electricity from the transformer, and the method further comprises receiving metered data relating to consumption of electricity. The one or more devices may include the one or more utility meters and the wireless mesh network is formed comprising the apparatus and the one or more utility meters. The method may further comprise transmitting the radio frequency signaling to the one or more utility meters for retransmission along the wireless mesh network to another device accessing the wireless mesh network, and receiving receive the further radio frequency signaling originating from the another device, which is or more of a computer, laptop, tablet computer, and a mobile phone or device, being provided with Internet connectivity via the wireless mesh network.

DETAILED DESCRIPTION OF THE INVENTION

The present invention will now be described with reference to FIGS. 1A-3D.

The overall smart power grid network according to the present application represents an interconnected so-called "BIG DATA" technology system providing advanced intelligence and synergistic components across power metering, distribution and communication, optimization and installation and servicing. The network incorporates discrete elements in the transformer monitoring and communications, residential and commercial metering and analytical, predictive and preemptive software algorithms. The hardware associated with the network facilitates communications with transformers, residential and commercial meters, and other Internet/wireless connected devices (commonly referred to as the "Internet of Things" (IoT)). The network's geographically dispersed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems and graphical user interface methodologies across this interconnected smart grid network and similar networks. The collective systems provide a synergistic and unique alternative network for Business to Business (BtB)/Business to Consumer (BtC) data receipt, delivery and monetization.

Figure 1A:
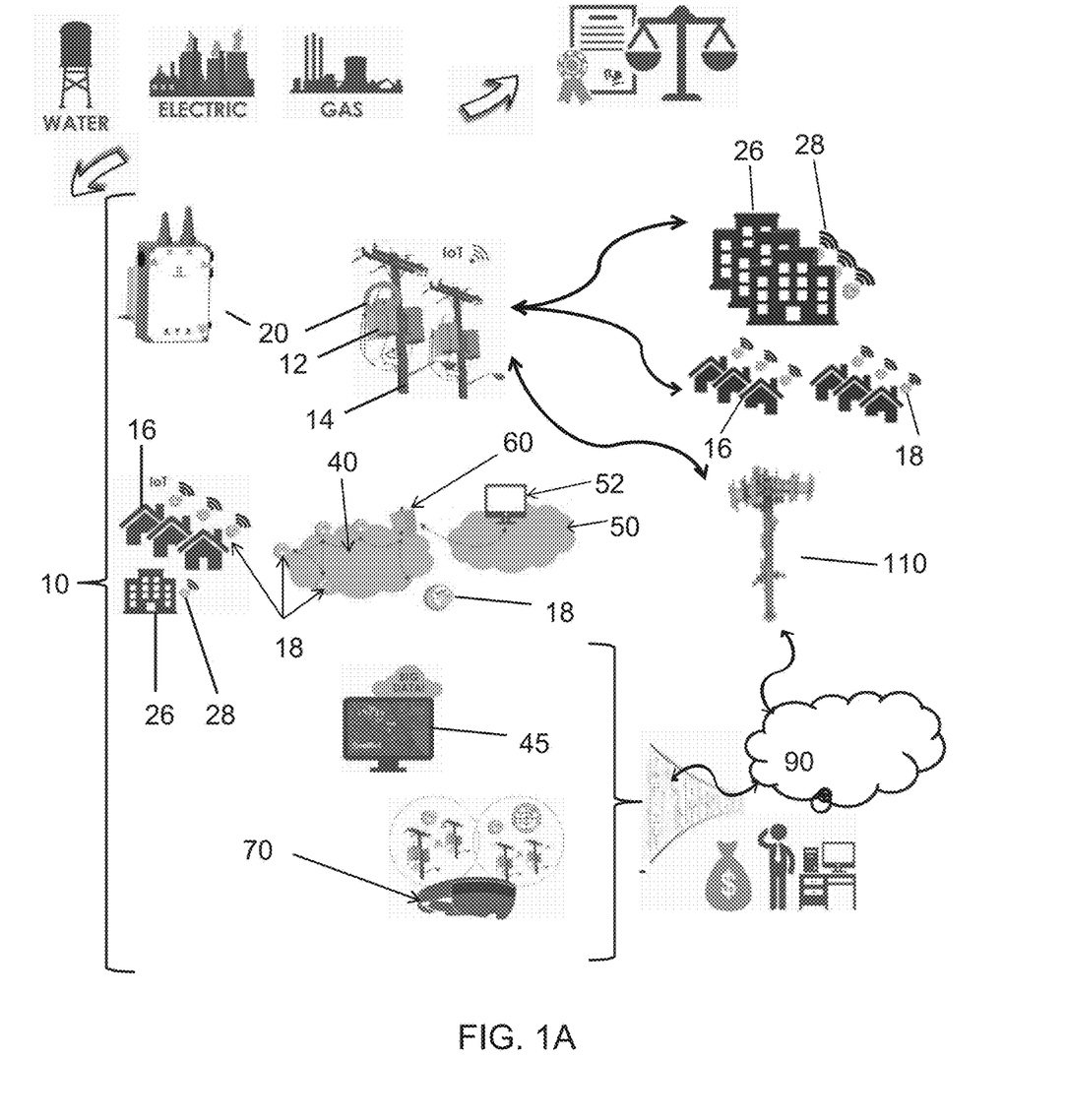
FIG. 1A is a diagram showing an establishment of a baseline, power grid centric, smart utility mesh network, according to some embodiments of the present application.

An example of an implementation of a smart grid network 10 is shown in FIG. 1A. The smart grid network 10 according to the present application represents a singular, standardized, and scalable network, providing the industry's first inclusive solution from a singular supplier. The smart grid network 10 may incorporate a utility financials rebalancing, and incorporate utility customers and IoT adjacencies. The smart grid network 10 is inclusive of four basic technology elements. The primary hardware and software constituents of the network are as noted and identified below.

1. The pole, pad or underground mounted transformer monitor/smart data collector device is identified herein as element 20, according to the present application (AKA "HyperSprout™"), which is the localized data aggregation and power flow investigation; establishing a data capture and delivery capability wherever there is power, e.g., consistent with that set forth in one or more of U.S. patent application Ser. No. 15/160,754 filed May 20, 2016 and Ser. No. 15/332,151 filed Oct. 24, 2016 and U.S. Pat. No. 9,961,572 issued May 1, 2018, which are hereby incorporated by reference in their entireties.

2. A digital data and delivery and receipt mesh network (AKA "DataVINE™") is identified herein as element 40, which is a ubiquitous mesh network facilitating automated residential and commercial metering while deploying an alternative data delivery capability; enforcing a market-leading 100% meter read capability, e.g., consistent with that set forth in one or more of U.S. patent application Ser. No. 15/250,119 filed Aug. 29, 2016 and Ser. No. 15/442,244 filed Feb. 24, 2017, which are hereby incorporated by reference in its entirety.

3. A smart node power grid communication protocol and analytics platform (AKA "DataSCAPE™"), identified herein as element 45, which provides for a comprehensive nodal exchange analysis of all grid parameters; realizing an inclusive geo-spatial understanding of utility operations, e.g., consistent with that set forth in U.S. patent application Ser. No. 15/677,920 filed Aug. 15, 2017, which is hereby incorporated by reference in its entirety.

4. A head-mounted user device 70 for enhanced reality field investigation, interaction and servicing; deploying the industry's first "virtual" utility (AKA "PowerVISR™"), e.g., consistent with that set forth in U.S. Pat. No. 10,055,869 issued Aug. 21, 2018, which is hereby incorporated by reference in its entirety.

The smart grid network's hardware and software solution allows for the identification of the purposeful diversion of energy (i.e., theft) and the focused remediation of the offending areas or subjects, subsequently enhancing enterprise revenues (See, e.g., U.S. Pat. No. 10,055,966 issued Aug. 21, 2018, which is hereby incorporated by reference in its entirety).

The smart grid network 10 provides the inclusion of wireless communications and data transmission capability into transformer monitoring modules 20. The transformer modules 20 may be mounted directly to utility transformers 12, poles 14, or other objects and structures, or underground, in the field and include the capability to both collect and transmit information from the transformer 12, residential and commercial meters 18, 28 and other Internet/wireless Wi-Fi connected devices not associated with the smart grid network 10. These devices 20 differ from other existing technologies by incorporating a transceiver, transmitter and antenna collectively within the same device to both collect data from other network devices, including other transformer monitoring devices 20, meters 18, 28 and user devices, deployed in the field and communicate data back to a central location or other connected devices. Additionally and in contrast to other AMI systems, these devices and the resulting smart grid network build out a Wi-Fi enabled wireless wide area network ("WWAN") mesh network, accessible by the full portfolio of Wi-Fi enabled products, both commercial and consumer and not necessarily associated with the smart grid.

FIG. 1A provides a summary of the smart grid and mesh network implementation. As noted, the addition of the transformer monitoring device 20 and mesh network 40 provides an infinitely scalable data delivery and receipt capability for communities with poorly established, historical infrastructure while providing a synergistic network capability to those communities with current cellular, satellite, microwave, or other similar back-haul methodologies. This data delivery and receipt capability provides not only a full AMI system but builds out an alternative Wi-Fi mesh network 40 accessible by consumer, commercial and other digital devices not associated with the smart grid.

The smart grid network 10 and the mesh network 40 enabled by the transformer monitor device 20 and other network devices provide network access to an end user. Additionally, the end user may use the established network for the purpose of storing and retrieving data and files from a cloud-based server 90.

By way of example, FIG. 1A shows an example of a smart power grid network generally indicated as 10. The smart power grid network 10 may take the form of, or may be configured to include, one or more digital data and delivery and receipt mesh networks 40. Each digital data and delivery and receipt mesh network 40 may include one or more communication nodes such as the transformer module or device 20 for exchanging information upstream and downstream between the communication nodes and a central location, e.g., which may take the form of a private network 50 in FIG. 1A. The one or more communication nodes may be configured to be able exchange such upstream and downstream information between themselves in order to exchange such upstream and downstream information between a respective communication node and the central location 50.

In FIG. 1A, the smart power grid network 10 may include transformers 12 for providing electric energy to residential homes and commercial buildings 16, 26, each having a respective electrical meter 18, 28 for measuring the associated electrical energy usage. The smart power grid network 10 may also include transformer monitor/data collection devices 20 configured to collect data about the electrical energy usage in relation to residential homes and commercial buildings 16, 26 from the respective electrical meter 18, 28. For example, each electrical meter 18, 28 may provide metered data signaling containing information about metered data related to associated electrical signaling being supplied from the transformer 12 to the building or structure 16, 26 in the grid network 10. Moreover, transformer monitor/data collection devices 20 may receive associated signaling containing information about electrical signaling data related to electricity being processed by the transformer 12 located and arranged in the grid network and to which the transformer monitoring device is mounted, as well as other wireless network data related to other communication nodes forming part of other wireless network devices deployed in the grid network. In effect, the collected data received by the transformer monitor device 20 may include some combination of the electrical signaling data related to the transformer, the metered data related to the electrical meter 18, 28 and/or the other wireless network data related to other communication nodes in the grid network, e.g., which may include digital content as set forth in further detail below and not necessarily associated with the smart grid.

The pole 14 mounted transformer monitoring device 20 may be configured in communication with the electrical meter 18 associated with the residential home 16. By way of example, the electrical meter 18 may be configured to measure single phase electrical energy provided by the transformer 12 along a single phase utility line to the residential home 16.

In comparison, the pole 14 mounted transformer monitoring device 20 may also include, or take the form of, a pad mounted or underground transformer device 20 in communications with an electrical meter 18, 28 associated with a commercial building or home 16, 26 or a pad mounted or an underground transformer. By way of example, the electrical meter 18, 28 may be configured to measure three phase electrical energy provided by a pad transformer or underground transformer along a three phase utility line to the commercial building or home 16, 26.

FIG. 1A shows that the transformer monitoring device 20 may be configured to collect data related to some distribution related functionality, e.g., including determinations related to outage, momentary outage, voltage/VAR, and/or transformer monitoring. The transformer monitor device 20 may be configured to collect data related to some voltage analysis, DRM functionality and energy theft functionality in relation to its associated residential home or commercial building. The transformer monitor device 20 can provide the suitable signaling containing information about the collected data to the private network 50 via the digital data and delivery and receipt mesh network 40. The collected data received by the private network 50 may also be analyzed in relation to conservation, load curtailment and/or a demand response vis-a-vis the power utility. In FIG. 1A, the private network 50 may include a private network computer and monitor 52 for performing or implementing the aforementioned analysis and functionality.

FIG. 1A also shows a relay 60 coupled between the digital data and delivery and receipt mesh network 40 and the private network 50. The relay 60 may be a wireless device, such as a Wi-Fi extender, which takes the Wi-Fi signal from a meter 18, 28 (or a transformer monitoring device 20) in the wireless mesh network 40, and brings it into a home 16 or business 26 for public or private Wi-Fi access via a public or private network 50. The relay 60 may also be a hard line which is wired to the utility and services an on-site, dedicated server. In either case, the relay device 60 would connect to the signal from a transformer monitoring device 20 or smart meter 18, 28 and bring this signal from the outside-the-home wireless mesh network 40 to an inside-the-home or business private or public network 50.

In a consumer or commercial application of network 50, the home 16 or business 26 serves as a central location, which is receiving and transmitting data using its own, internal, personal network 50, such as via a Wi-Fi router that may be password protected. The signal supporting this router would be the wireless mesh network 40 outside the business 26 or home 16. For a business 26, the network 50 may be an open Wi-Fi hotspot which is servicing works, patrons or both. The relay 60 is extending the wireless mesh network 40 into the residence 16 or business 26.

The private network 50 may be configured as a central point for a utility or network operations center that processes the collected data, e.g., performing utility analysis that may include one or more of the following: delivery subtraction analysis, proactive asset monitoring, distribution asset utilization, T and D subtraction analysis, energy audits and analysis, load control, geographic localization and define pro-active and pre-emptive asset efficiency or operational activities. By way of example, the utility analysis may be performed in an effort to increase efficiency, decrease costs, increase profits and/or community engagement related to the operation of the smart grid network 10. For this embodiment, a utility network operations center can serve as a central location, which may operate through the cloud based server 90, or may not operate through the cloud 90 but can operate directly off of a node in the mesh network 40. This embodiment would be representative of those utilities seeking a hard line access and storage rather than a cloud-based infrastructure.

FIG. 1A shows that the digital data and delivery and receipt mesh network 40 may include other transformer monitor devices 20 exchanging information with other meters 18, 28 associated with other buildings or structures 16, 26.

Once established, the smart grid mesh network implementation and the associated transformer module and mesh network hardware and software assets may be easily expanded to allow for integration with both smart city infrastructure 16, 26, home automation smart devices and other digital devices not associated with the smart grid. For example, inclusion of a smart grid mesh network communications chip set for implementing smart grid mesh network communications chip set signal processing functionality into locally deployed smart assets allows for both the capture and communications of digital information both to and from these smart asset devices. By way of example, these smart asset devices may include, or take the form of, set top boxes having the smart grid mesh network communications chip set contained therein, e.g., for communicating with a transformer module 20, or for communication with the so-called cloud-based server 90. In areas of established infrastructure, this capability allows for the localized capture and communications with smart devices within the geographical confines of the mesh network. In areas where coordination is required outside of this localized network, a back-end cellular capability may be utilized, like the back-end cellular functionality associated with a back-end cellular tower 110. In peri-urban and rural areas of extremely poor infrastructure and cellular service, the smart grid mesh network deployed system provides a competitive and less costly alternative to dedicated cellular infrastructure and may be paired with various wireless transmissions medias including cellular, satellite, microwave, TVWS, optical or other wireless transmissions media either now known or later developed in the future.

The mesh network 40 described herein is an open network, such that those within the geographic region of operation will opt-in if desired, through the utility company, telecommunications partner or local ISP partner administering the network. The network is not closed to any individuals opting in, provided they have been authenticated using the appropriate security protocols. The network is configured to support a throughput of up to 600 Mbps and potentially greater based upon expansion of governing IEEE protocols, as noted in the appropriate IEEE specification, and as realized in a 802.11s wireless mesh network topology.

By way of further example, the integration with, or replacement of, local wireless network delivery systems allows the seamless integration with current home automation technology, allowing for the direct communication with these devices using the smart grid network deployed system, and other digital devices not associated with the smart grid.

Scaling of the deployed transformer modules or devices 20 with ongoing optimization of the defined mesh network 40 allows for establishing a lucrative alternative pathway for digital content receipt and delivery to networked consumers. Recognizing the proliferation of digital set-top boxes like elements from the leading consumer technology innovators, inclusion of the smart grid network chip set within these devices provides an alternative capability for digital content beyond that currently offered by cellular and broadband suppliers and not necessarily associated with the smart grid network. The digital content may include movies, songs, photographs, advertising media, social media exchanges, internet searching requests, internet searching downloads, digital imagery, web page renderings, streaming media, on-line gaming, voice over internet, video over internet, email communications, business analytics, consumer analytics, industrial automation including SCADA activities, home automation, governmental and emergency related broadcasts, digital business model facilitation, including on-line commerce.

Figure 1B:
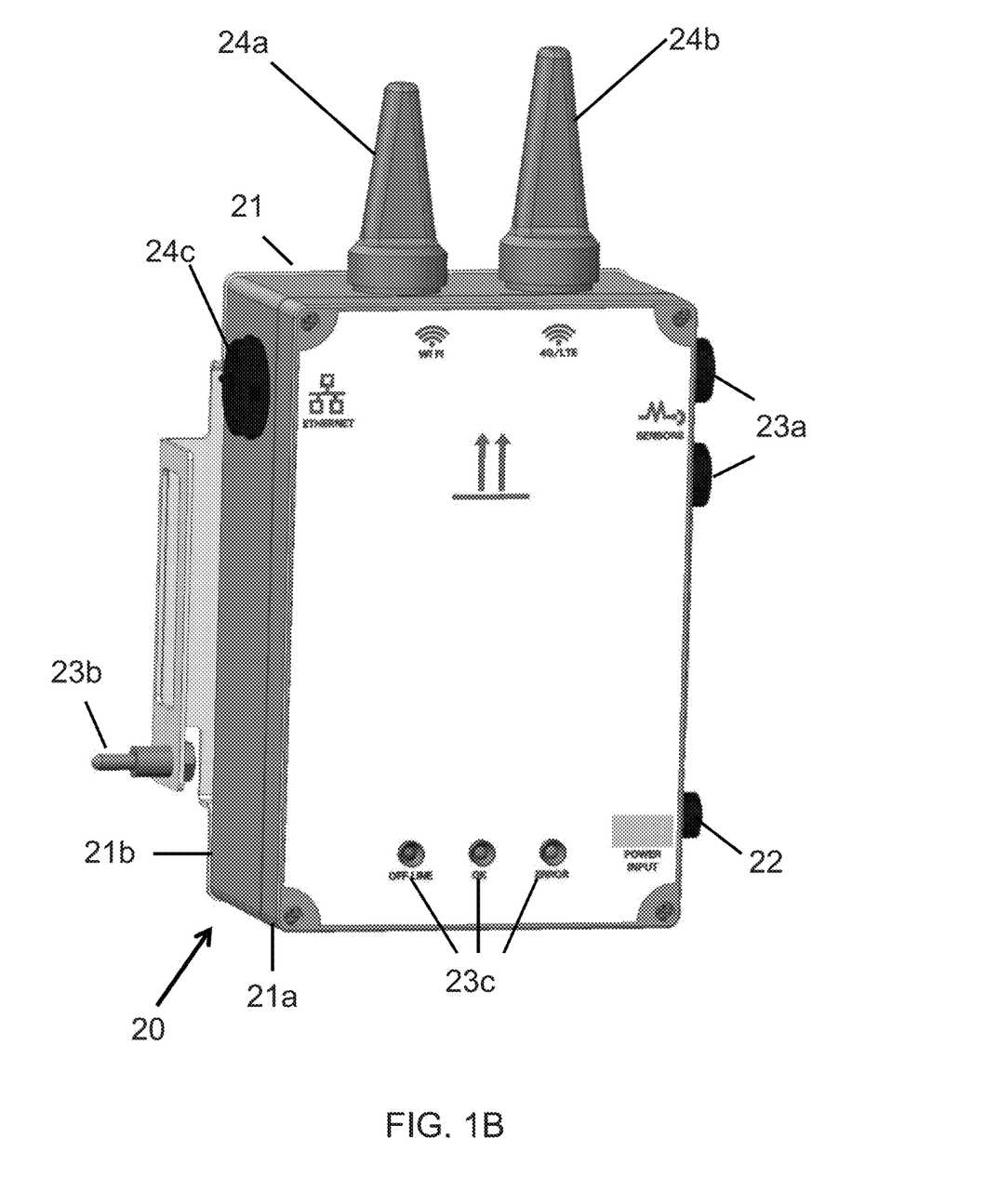
FIG. 1B shows a transformer monitoring device according to some embodiments of the present application.

An example of a transformer monitoring device 20 according to the present application is shown in FIG. 1B. The transformer monitoring device 20 comprises a housing 21, including an upper housing 21a and lower housing 21b secured together. Additional circuitry and signal processors (not shown) relating to the operation of the transformer monitoring device 20 are disposed within the housing 21. The transformer monitoring device 20 may include an input 22 to receive power from a power source. One or more sensor inputs 23a are provided on the transformer monitoring device 20 that are configured to receive inputs from one or more sensors. The sensors that may be used with the transformer monitoring device 20 include, but are not limited to, a thermistor 23b to monitor the ambient temperature, temperature sensors to measure the temperature of the transformer and/or the transformer monitoring device 20, a proximity sensor, a Rogowski coil associated with a transformer 12 to monitor the transformer current, oil temperature, oil level and moisture level. One or more status indicators 23c can be provided on the face of the device 20, such as to indicate whether the device 20 is off-line or experiencing an error. The transformer monitoring device 20 includes one or more antennae for receiving and transmitting various signaling. In the embodiment of the transformer monitoring device 20 shown in FIG. 1B, the transformer monitoring device 20 includes a Wi-Fi antenna 24a to receive and transmit Wi-Fi signaling and a cellular antenna 24b to receive and transmit cellular signaling, such as 2G, 3G, 4G, 5G, LTE communications. An Ethernet port 24c may also be provided to connect an Ethernet cable to the transformer monitoring device 20, which may be used to receive and transmit signaling on via a hard wired configuration, including fiber-optic communication.

The transformer monitoring device of the present application provides for and enables a dual function implementation of monitoring smart grid assets in a smart grid network of a community, city or other geographic area, and building a wireless mesh network to provide Wi-Fi access to the community, city or other geographic area. The transformer monitoring device monitors transformer performance and health and monitors and controls smart metering assets in a grid network, which can be overseen by a utility provider. With the same transformer monitoring device and smart metering assets, a separate wireless mesh network can be created, in which for example, the transformer monitoring device operates as a first, access node to the mesh network and the smart meters operate as second and subsequent nodes in the mesh network, so as to provide a Wi-Fi mesh network that can provide Internet access to consumers.

One further technique to solve Internet connectivity issues in communities lacking Internet connectivity is the application of TVWS as a backhaul to the smart grid network enabled Wi-Fi mesh network.

Advantages for backhauling through TVWS are multiple, including: long range broadcasting capability exceeding five miles, non-line-of-sight broadcasting with properly outfitted receiving units, excellent penetration of natural barriers, and low power consumption.

Noting the advantages of TVWS, the transmission capability does not afford a direct connectivity capability to traditional digital products and consumer devices, such as computers, laptops, tablets, mobile phones and devices, and other Wi-Fi connected products. Consequently, a special system or device is required for the conversion of the transmitted TVWS signal to a traditional radio frequency ("RF") methodology, i.e. Wi-Fi.

In accordance with an embodiment of the present application, a TVWS outfitted transformer monitoring device 200 is provided that incorporates the appropriate antenna, receiving electronics and algorithms necessary to facilitate data communications along the smart grid network enabled Wi-Fi mesh network, allowing the direct application of TVWS to a fully-realized Wi-Fi mesh network build-out accessible to consumer devices, such as computers, laptops, tablets, mobile phones and devices, to provide Internet connectivity to such devices. The hardware and software elements are incorporated both within and/or external to the current transformer monitoring device housing and also replicated, for unmanned aerial vehicle (UAV) applications. The combination of TVWS with the smart grid network and its Wi-Fi mesh network affords a compelling solution for rural communities where residential distances are quite large and traditional infrastructure costs would be prohibitive for traditional Internet delivery methodologies. Further, incorporation of the TVWS technology to optically enabled transformer monitoring device technology provides another opportunity to deploying a purposeful, hybrid and wireless system.

Several examples of mesh networks using a TVWS provisioned transformer monitoring device may be seen in FIGS. 2D-3D. Similar to the baseline smart grid network transformer monitoring device mesh network technology of FIG. 1A, the TVWS provisioned transformer monitoring device mesh network is self-registering and self-correcting, allowing for individual TVWS provisioned transformer monitoring devices to correct for the most optimal data transfer across the enabled Wi-Fi mesh network.

The present solution enhances utility enterprise operations through the synergistic implementation of a smart grid network and balance sheet refinancing model while deploying a unique, alternative network for BtB/BtC data receipt and delivery. This alternative BtB/BtC Wi-Fi enabled network provides both a compelling resource for municipality monetization whilst enabling a compelling capability for rural and emerging market broadband Internet delivery. A TVWS provisioned transformer monitoring device is provided in accordance with the present application, and its data transmission backhaul advantages in both emerging market and developed region rural communities using the advantageous features of underutilized broadcasting channels in both the VHF and UHF spectrum.

Figure 2A:
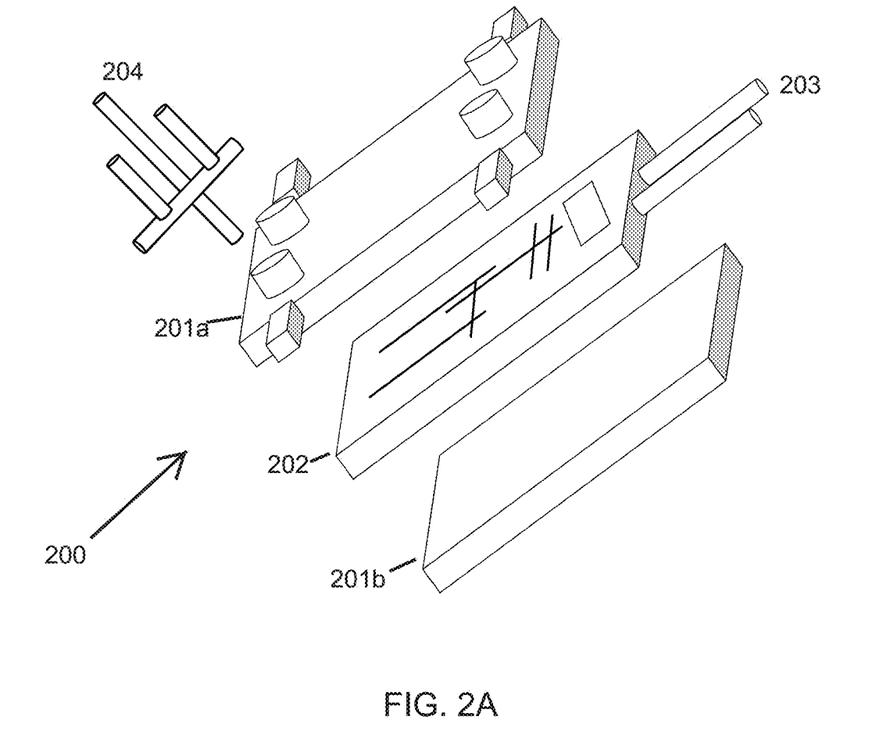
FIGS. 2A-2C are diagrams of a TVWS provisioned transformer monitoring device construction and location in accordance with an embodiment of the present application.

FIG. 2A illustrates an example of a TVWS provisioned transformer monitoring device 200. According to one embodiment, the TVWS provisioned transformer monitoring device 200 comprises a housing having an upper housing 201a and a lower housing base 201b, internal circuitry 202 within the housing and external cables 203. The TVWS provisioned transformer monitoring device 200 may be configured similarly to the transformer monitoring device 20 shown in FIG. 1B and comprise any or each of components included therein. The device 200 further comprises a TVWS antenna 204 and associated circuitry, which can be built into the internal circuitry 202 and incorporated directly into the housing, or located externally to the housing. In certain embodiments, the TVWS antenna 204 may be provided in place of the cellular antenna 24b of the device 20 shown in FIG. 1B. In other embodiments, the TVWS provisioned transformer monitoring device 200 comprises the TVWS antenna 204, and also the Wi-Fi antenna 24a and the cellular antenna 24b. The TVWS antenna 204 may extend from a side of the housing of the device 200 or be inserted into a port of the device 200, such as an Ethernet port 24c.

Figure 2B:
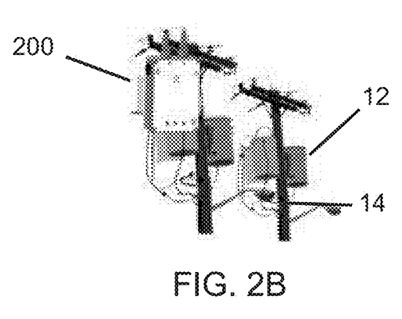
Figure 2C:
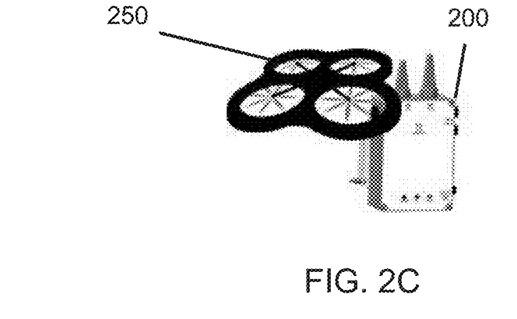

The internal circuitry 202 is inclusive of transmission, reception, data format manipulation, networking, data aggregation, and sensor input, amongst other requirements. In certain embodiments of the TVWS provisioned transformer monitoring device 200, external cables 203 are provisioned for data receipt and transmission and device power. The transformer monitoring device unit 200 can also have accommodations for wireless power transfer via inductance or tuned magnetic resonance. The housing base 201b is provisioned for magnetic attachment, bolt attachment, or other attachment methodologies to attach the transformer monitoring device 200 to another object. For example, FIG. 2B shows a TVWS provisioned transformer monitoring device attached to a pole 14 mounted utility transformer 12 and FIG. 2C shows a TVWS provisioned transformer monitoring device 200 attached to an unmanned aerial vehicle 250 (UAV), such as a drone. The assembled housing is hermetically sealed against the ingress of environmental elements. All interconnect ports are also sealed. Protection is provided for electromagnetic interference ("EMI"). Additional capabilities include protection against Electromagnetic Pulse (EMP). The construction of the transformer monitoring device 200 has an ergonomic focus for easy transport, attachment, detachment and decommissioning.

The TVWS antenna 204 comprises internal circuitry for powering, receiving and broadcasting associated with the TVWS spectrum. In the case of a direct wired transmission from a central TVWS receiving point to a TVWS provisioned transformer monitoring device 200, (FIG. 3D), the antenna 204 may not be required. The receiving electronics are modified from, and in some cases additional to, those currently used for 2G, 3G, 4G, LTE and upcoming 5G receiving to provide power changes, associated impedance matching to provide the optimum performance of the antenna 204, link balance, data format manipulation, channel selection and management, and other associated capabilities to integrate, administer and optimize the TVWS signal into the transformer monitoring wireless mesh network. These electronics also work to ensure no interference between the TVWS signal 305 and the transformer monitoring device 200 broadcast Wi-Fi wireless mesh network signal 340 and in, some cases, cellular backhaul if incorporated for secondary backhaul capabilities. Before leaving the TVWS provisioned transformer monitoring device 200 and moving into the mesh network, the TVWS signal 305 is converted into a Wi-Fi signal 340. The entire data receipt and processing process replicates in reverse to pass data from the mesh network back through the TVWS provisioned transformer monitoring device 200 and out through the TVWS backhaul. The TVWS provisioned transformer monitoring device 200 may be further configured for optical and/or fiber optic communication and processing, including comprising an optical signal transmitter, optical signal receiver, and an optical signal processor. An example of a transformer monitoring device configured for optical signal communication can be found in applicant's U.S. patent application Ser. No. 15/332,151 filed on Oct. 24, 2016, which is hereby incorporated by reference in its entirety.

Figure 2D:
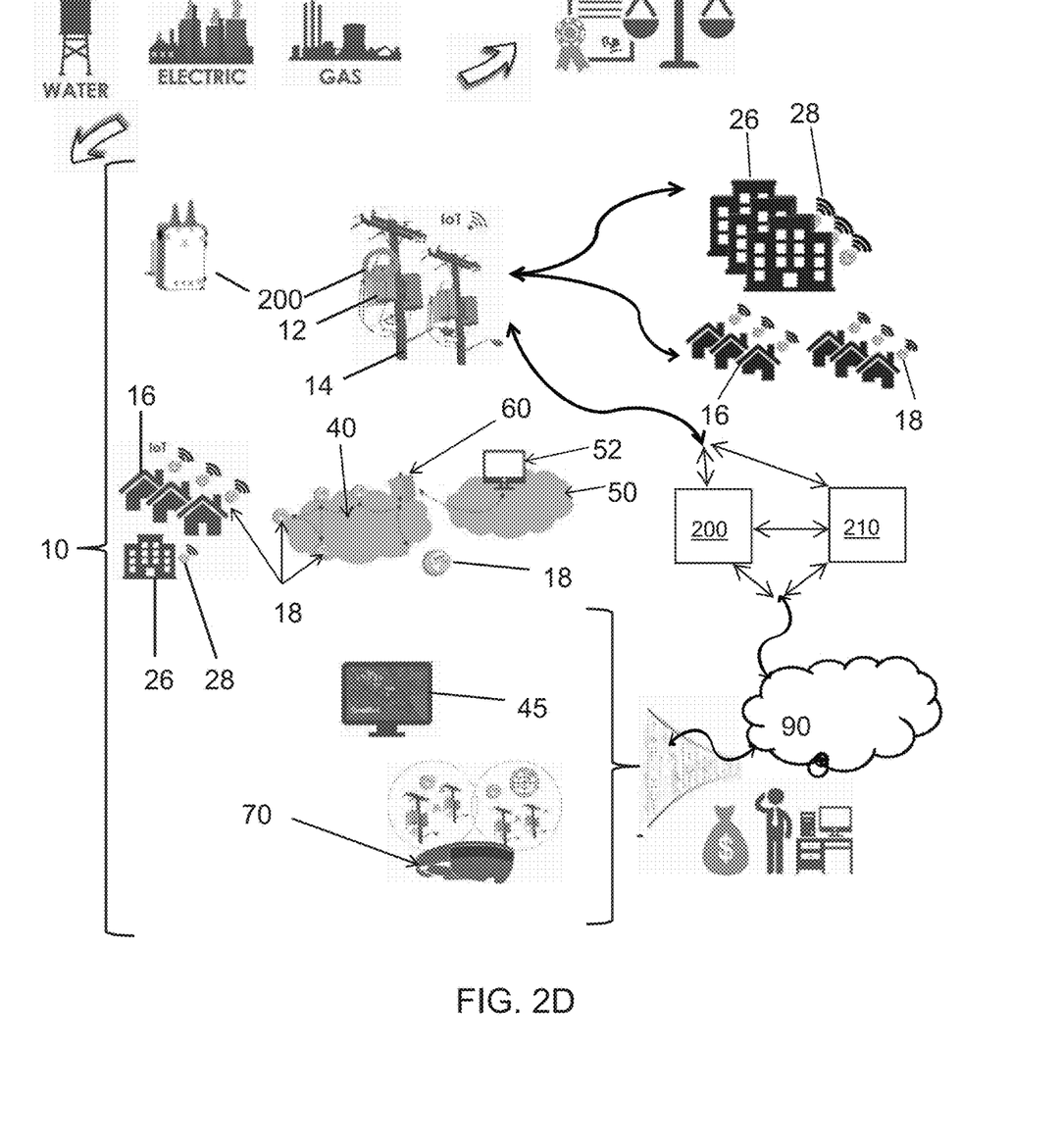
FIG. 2D is a diagram of an evolution of a baseline, power grid centric, smart utility mesh network, using TVWS provisioned transformer monitoring device technology.

FIG. 2D shows a baseline, power grid centric, smart grid network 10 incorporating TVWS provisioned transformer monitoring device 200 technology. The operation and components of the smart grid network 10 and mesh network 40 shown in FIG. 2D may be similar to those shown in FIG. 1A, except that TVWS provisioned transformer monitoring devices 200 are utilized, and a TVWS backhaul is provided by way of the TVWS provisioned transformer monitoring devices 200 and/or TVWS collection points 210, in place of a cellular head-end 110. The provision of a mesh network utilizing a TVWS backhaul with the TVWS provisioned transformer monitoring devices 200 and/or TVWS collection points 210 is described in further detail below with respect to FIGS. 3B-3D.

Figure 3A:
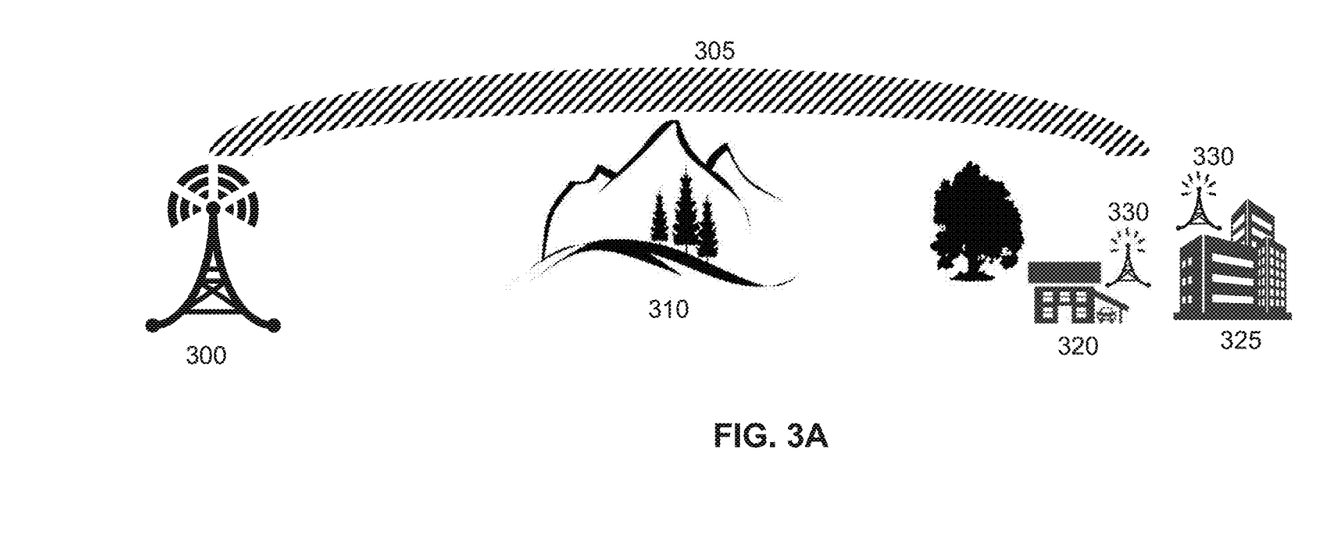
FIG. 3A is a diagram of an example of a baseline TVWS broadcasting and receiving scenario between two dispersed geographic locations.

FIG. 3A shows a standard methodology for broadcasting a TVWS signal 305. A TVWS broadcast point 300 is provided, which may be administered by an internet service provider (ISP) and owned by a telecommunications company, municipality or another entity. The TVWS broadcast 300 is arranged at a central location, which broadcasts the TVWS signal 305 over a large geographic area. The TVWS broadcast point 300 allows bi-directional communications. The signal 305 is broadcast radially in all directions and does not require a line of sight. The broadcast signal 305 can be propagated through natural barriers 310 with no line of sight for distances exceeding five miles to a receiving point 330 at a residence 320 or business 325. The signal 305 is received at a residence 320, a business 325 or a central re-broadcasting location via the use of a TVWS reception device 330. However, there are several issues that occur at the receiving point. Additional hardware is required at the receiving point to convert the TVWS signal 305 into a format useable by commercial/consumer electronics, i.e., Wi-Fi, and all reception points must have this specialized equipment.

Figure 3B:
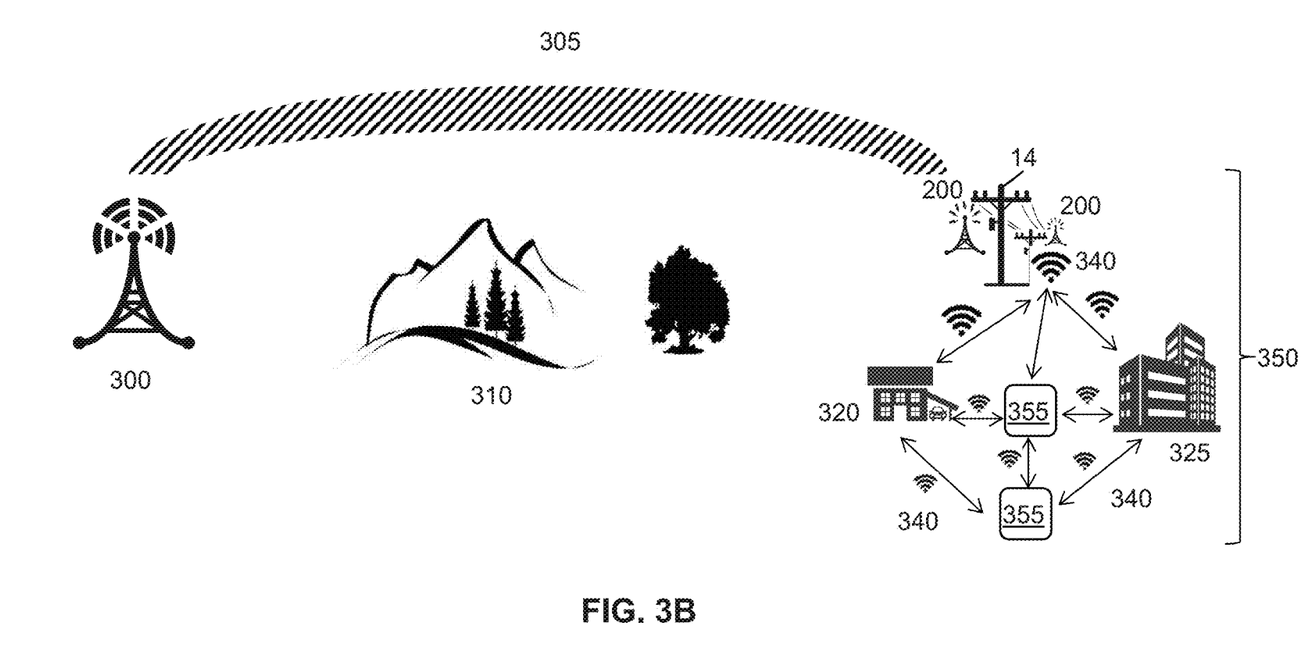
FIG. 3B is a diagram of an embodiment of a smart grid mesh network enabled with TVWS provisioned transformer monitoring devices, including TVWS provisioned transformer monitoring devices with bi-directional communication using TVWS.
Figure 3C:
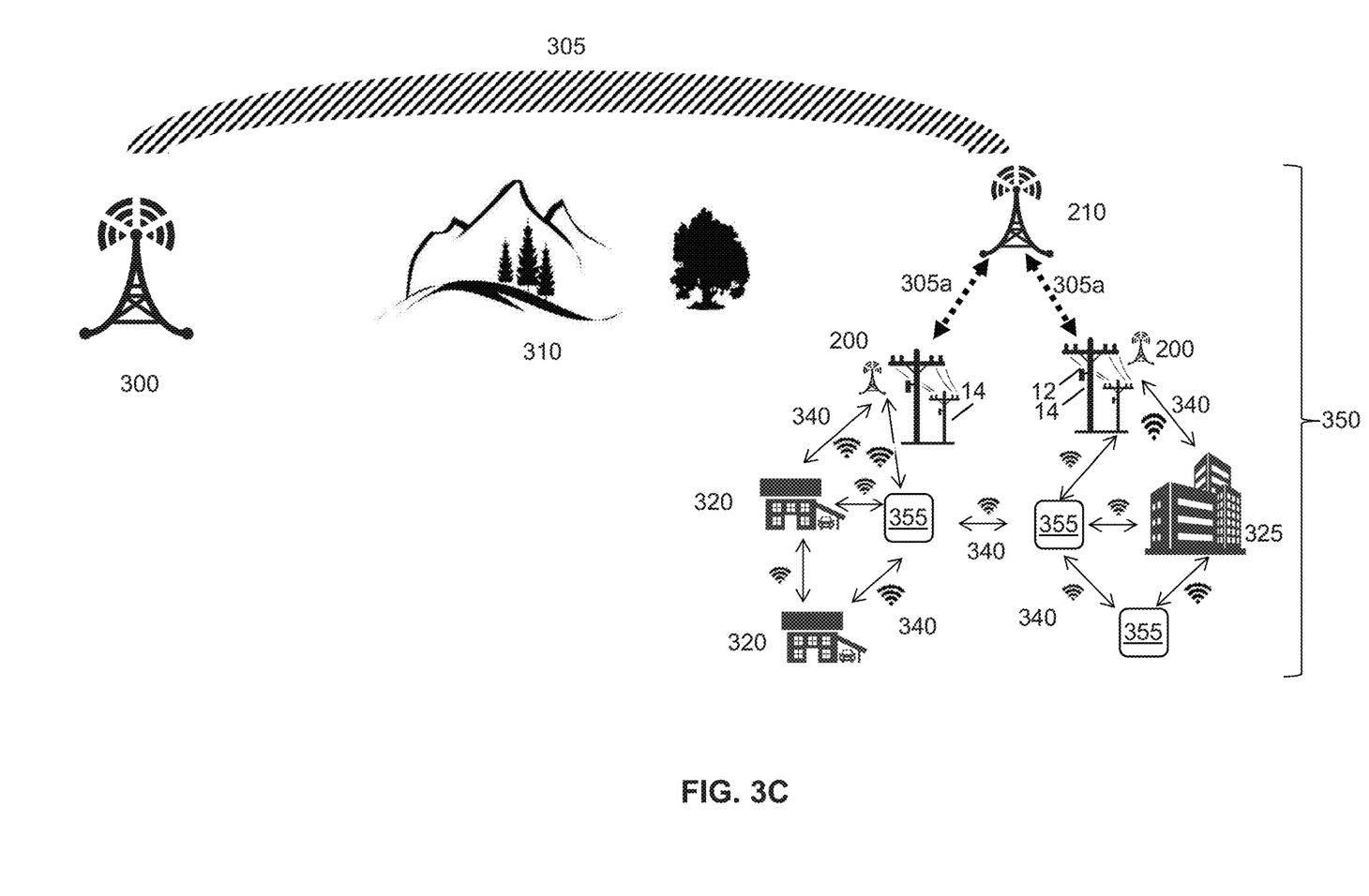
FIG. 3C is a diagram of a further embodiment of a smart grid mesh network enabled with TVWS provisioned transformer monitoring devices, including a TVWS central collection point broadcasting a local TVWS signal.
Figure 3D:
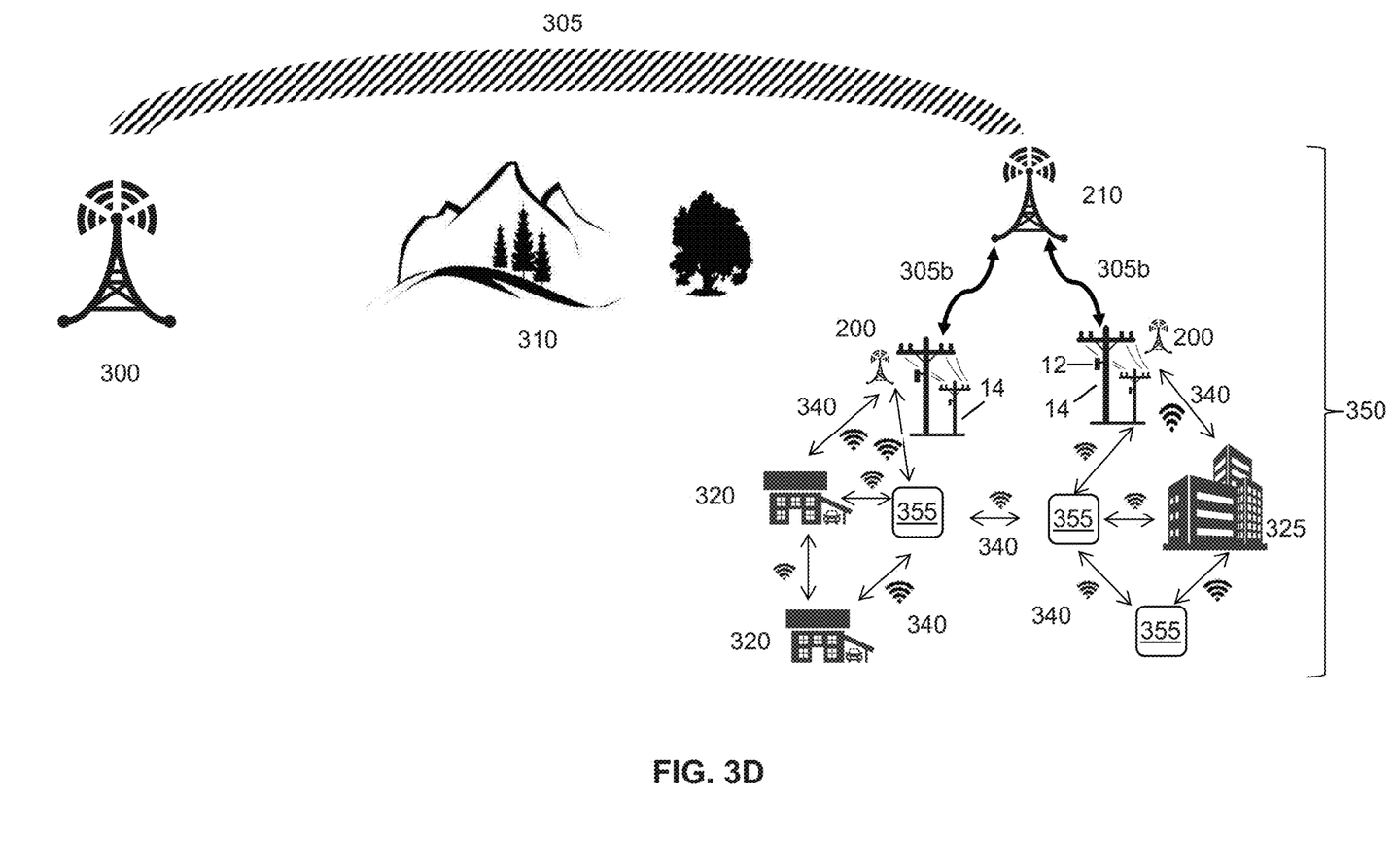
FIG. 3D is a diagram of a further embodiment of a smart grid mesh network enabled with TVWS provisioned transformer monitoring devices, including a TVWS central collection point wired for bi-directional communication with transformer monitoring devices.

FIGS. 3B-3D show various examples of a smart grid network and mesh network enabled with TVWS provisioned transformer monitoring devices 200.

FIG. 3B shows an example of TVWS provisioned transformer monitoring devices 200, with bi-directional communication using TVWS. The TVWS broadcast point 300 and signal 305 may be similar to that described in FIG. 3A. The receiving point of the TVWS broadcast signal 305 is at TVWS provisioned transformer monitoring devices 200. At the TVWS provisioned transformer monitoring device 200, a Wi-Fi signal 340 is broadcast by the TVWS provisioned transformer monitoring device 200 and mesh network enabled smart meters. There are several advantages at this receiving point. Access can be provided to all Wi-Fi products (320, 325, 355) with no additional hardware required. Additionally, a full Wi-Fi WWAN mesh network 350 is provided.

In FIG. 3B, the transformer monitoring device 200 is equipped with TVWS broadcast reception and transmission hardware, internal to the device 200 or as a potential add-on to the device 200. A central location 300 broadcasts the TVWS signal 305 over a large geographic area. The reception of the TVWS signal 305 does not need to be line-of-sight and can pass through natural barriers 310. The TVWS signal 305 is received by the transformer monitoring device 200 equipped with TVWS broadcast reception and transmission hardware, including an antenna 204 configured for wireless reception and transmission. This hardware can also broadcast TVWS signals 305 to allow bi-directional communication, using the TVWS signal 305 as the back-haul. The TVWS provisioned transformer monitoring device 200 receives the TVWS signal 305 and converts the TVWS signal 305 into a fully realized Wi-Fi mesh network 350. A converted Wi-Fi signal 340 is broadcast by the device 200 through the mesh network 350 extending from the TVWS provisioned transformer monitoring devices 200 to the mesh network enabled smart meters at both residences 320 and businesses 325. This procedure removes the need to add additional Wi-Fi broadcasting and receiving (i.e., routing) equipment to the baseline configuration shown in FIG. 3A.

Devices at and within the residences 320 or buildings 325, including but not limited to computers, laptops, tablets, mobile phones and devices, set-top boxes, wireless routers, smart meters and other smart home appliances, can be securely authenticated into the resulting Wi-Fi network 350 and back-hauled through the TVWS backhaul to provide Internet connectivity to such devices. In addition, any other Wi-Fi enabled device 355, outside of or unassociated with the residences 320 or buildings 325, can also be securely authenticated into the resulting Wi-Fi network 350 and back-hauled through the TVWS backhaul to provide Internet connectivity to such devices 355. The devices 355 may include traditional digital products and consumer devices, such as computers, laptops, tablets, mobile phones and devices, smart watches and other products capable of providing a consumer with a Wi-Fi or Internet connection. The devices 355 may be independent from the grid network and wireless mesh network 350 connection provided to the user for general Internet connectivity and operations unrelated to the consumption, measurement or management of utilities or smart grid assets. The mesh network 350 is not limited to the particular composition of devices and structures illustrated in FIG. 3B, but can include a variety of devices associated with various other buildings 320, 325 and other user devices 355 arranged in a number of configurations.

FIG. 3C shows an example of TVWS provisioned central collection point 210, with TVWS bi-directional communication with TVWS provisioned transformer monitoring devices 200. The TVWS broadcast point 300 and signal 305 may be similar to that described in FIG. 3A. The receiving point of the TVWS broadcast signal 305 is at a TVWS provisioned collector 210 and local transmitter. There are several advantages at this receiving point. Access can be provided to all Wi-Fi products with no additional hardware required. Additionally, a full Wi-Fi WWAN mesh network 350 is provided.

FIG. 3C shows the local wireless communications between TVWS provisioned transformer monitoring devices 200 and a centralized TVWS collection point 210. The local wireless communications between the centralized collection point 210 and the transformer monitoring devices 200 is via a TVWS signal. This methodology is useful for when a very long transmission range is generated between two long-backhaul TVWS broadcasting stations, such as TVWS broadcast point 300 and TVWS collection point 210. Locally, the TVWS signal 305 is picked up from the broadcast point 300 at a local centralized collection point 210. A central location 300 broadcasts the signal 305 over a very-large geographic area. The reception of the signal 305 does not need to be line-of-sight and can pass through natural barriers 310. The signal 305 is received by a central TVWS collector 210, which can also broadcast TVWS signals 305 to allow bi-directional communication, using the TVWS signal 305 as the backhaul. The central collector 210 sends a wireless broadcast 305a of the TVWS signal 305 locally to transformer monitoring devices 210 outfitted to receive the TVWS signal 305 via antennae 204. The transformer monitoring devices 200 receive the TVWS signal 305 and convert the TVWS signal 305 into a fully realized Wi-Fi mesh network 350. A converted Wi-Fi signal 340 is broadcast by the device 200 through the TVWS provisioned transformer monitoring device mesh network 350 extending from the transformer monitoring devices 200 to the mesh network enabled smart meters at both residences 320 and businesses 325. This procedure removes the need to add additional Wi-Fi broadcasting and receiving (i.e., routing) equipment to the FIG. 3A TVWS baseline configuration.

Devices at and within the residences 320 or buildings 325, including but not limited to computers, laptops, tablets, mobile phones and devices, set-top boxes, wireless routers, smart meters and other smart home appliances, can be securely authenticated into the resulting Wi-Fi network 350 and back-hauled through the TVWS backhaul to provide Internet connectivity to such devices. In addition, any other Wi-Fi enabled device 355, outside of or unassociated with the residences 320 or buildings 325, can also be securely authenticated into the resulting Wi-Fi network 350 and back-hauled through the TVWS backhaul to provide Internet connectivity to such devices 355. The devices 355 may include traditional digital products and consumer devices, such as computers, laptops, tablets, mobile phones and devices, smart watches and other products capable of providing a consumer with a Wi-Fi or Internet connection. The devices 355 may be independent from the grid network and wireless mesh network 350 connection provided to the user for general Internet connectivity and operations unrelated to the consumption, measurement or management of utilities or smart grid assets. The mesh network 350 is not limited to the particular composition of devices and structures illustrated in FIG. 3C, but can include a variety of devices associated with various other buildings 320, 325 and other user devices 355 arranged in a number of configurations.

FIG. 3D shows an example of a TVWS provisioned central collection point 210, with wired, such as cable, or fiber optic, bi-directional communication 305b with TVWS provisioned transformer monitoring devices 200. The TVWS broadcast point 300 and signal 305 may be similar to that described in FIG. 3A. The receiving point of the TVWS broadcast signal 305 is at TVWS provisioned collection point 210 and transformer monitoring devices 200. A wired connection 305b is provided between the TVWS collection point 210 and transformer monitoring devices 200. At the TVWS provisioned transformer monitoring device 200, a Wi-Fi signal 340 is broadcast by the TVWS provisioned transformer monitoring device 200 through the Wi-Fi mesh network 350. There are several advantages at this receiving point. Access can be provided by all Wi-Fi products (320, 325, 355) with no additional hardware required. Additionally, a full Wi-Fi WWAN mesh network 350 is provided.

FIG. 3D shows the direct wiring 305b of the TVWS provisioned transformer monitoring devices 200 to a centralized TVWS collection point 210. The direct wiring 305b may be coaxial cable, fiber optic cable, or other wiring or cabling known in the art suitable for the transmission of large amounts of data. A central location 300 can broadcast the TVWS signal 305 over a very-large geographic area and locally, the TVWS signal 305 is picked up from the broadcast point 300 at a local centralized collection point 210. The reception of the signal 300 does not need to be line-of-sight and can pass through natural barriers 310. The signal 305 is received by a central TVWS location 210, which can also broadcast TVWS signals 305 to allow bi-directional communication, using the TVWS signal 305 as the back-haul. From this central location 210, the TVWS signal 305 is transmitted by direct wiring 305b, such as over the utility poles 12, to transformer monitoring devices 200 outfitted to receive the direct wired TVWS signal 305. The transformer monitoring device 200 comprises a connection port configured to receive a wired connection 305b. The TVWS provisioned transformer monitoring devices 200 receive the TVWS signal 305 and convert TVWS signal 305 into a fully realized Wi-Fi mesh network 350. A converted Wi-Fi signal 340 is broadcast by the device 200 through the TVWS provisioned transformer monitoring device mesh network 350 extending from the transformer monitoring devices 200 to the mesh network enabled smart meters at both residences 320 and businesses 325. This procedure removes the need to add additional Wi-Fi broadcasting and receiving (i.e., routing) equipment to the FIG. 3A TVWS baseline configuration.

Devices at and within the residences 320 or buildings 325, including but not limited to computers, laptops, tablets, mobile phones and devices, set-top boxes, wireless routers, smart meters and other smart home appliances, can be securely authenticated into the resulting Wi-Fi network 350 and back-hauled through the TVWS backhaul to provide Internet connectivity to such devices. In addition, any other Wi-Fi enabled device 355, outside of or unassociated with the residences 320 or buildings 325, can also be securely authenticated into the resulting Wi-Fi network 350 and back-hauled through the TVWS backhaul to provide Internet connectivity to such devices 355. The devices 355 may include traditional digital products and consumer devices, such as computers, laptops, tablets, mobile phones and devices, smart watches and other products capable of providing a consumer with a Wi-Fi or Internet connection. The devices 355 may be independent from the grid network and wireless mesh network 350 connection provided to the user for general Internet connectivity and operations unrelated to the consumption, measurement or management of utilities or smart grid assets. The mesh network 350 is not limited to the particular composition of devices and structures illustrated in FIG. 3D, but can include a variety of devices associated with various other buildings 320, 325 and other user devices 355 arranged in a number of configurations.

It should be understood that, unless stated otherwise herein, any of the features, characteristics, alternatives or modifications described regarding a particular embodiment herein may also be applied, used, or incorporated with any other embodiment described herein. Also, the drawing herein may not be drawn to scale in whole or in part. Although the invention has been described and illustrated with respect to exemplary embodiments thereof, the foregoing and various other additions and omissions may be made therein and thereto without departing from the spirit and scope of the present invention.

What is claimed is:

1. An apparatus comprising:
   a first receiver configured to receive television white space signaling from a source;
   a first circuit configured to convert the television white space signaling into a radio frequency signaling;
   a mesh networking chip set configured to establish a wireless mesh network comprising the apparatus and one or more devices;
   a first transmitter configured to transmit the radio frequency signaling to the one or more devices;
   a second receiver configured to receive further radio frequency signaling from at least one of the one or more devices;
   a second circuit configured to convert the further radio frequency signaling into further television white space signaling; and
   a second transmitter configured to transmit the further television white space signaling to the source;
   wherein the further television white space signaling is a backhaul for the wireless mesh network
   wherein the apparatus is further configured to monitor activities of a transformer arranged in a utility grid, and the wireless mesh network provides broadband Internet connectivity to the one or more devices, wherein the apparatus is further configured to communicate with one or more utility meters associated with structures arranged in the utility grid, and to receive metered data relating to consumption of a utility from the one or more utility meters in the utility grid.

2. The apparatus according to claim 1, wherein the one or more utility meters comprise one or more electric meters, the structures associated with the one or more electric meters receive electricity from the transformer, and the apparatus is configured to receive the metered data further relating to the consumption of the electricity.

3. The apparatus according to claim 1, wherein the one or more devices comprise the one or more utility meters, wherein the wireless mesh network is formed comprising the apparatus and the one or more utility meters, and wherein the first transmitter of the apparatus is configured to transmit the radio frequency signaling to the one or more utility meters for retransmission along the wireless mesh network to another device accessing the wireless mesh network.

4. The apparatus according to claim 3, wherein the second receiver is configured to receive the further radio frequency signaling originating from the another device and wherein the another device is or more of a computer, laptop, tablet computer, and a mobile phone or device.

5. The apparatus according to claim 1, wherein the first receiver and second transmitter comprise an antenna for wirelessly receiving the television white space signaling and transmitting the further television white space signaling.

6. The apparatus according to claim 1, wherein the first receiver and second transmitter comprise a connection port configured to receive a cable connected to the source for receiving the television white space signaling and transmitting the further television white space signaling.

7. A system comprising:
a source configured to broadcast a television white space signaling;
an apparatus comprising:
a first receiver configured to receive the television white space signaling from the source;
a first circuit configured to convert the television white space signaling into a radio frequency signaling; and
a first transmitter configured to transmit the radio frequency signaling; and
one or more devices configured to receive the radio frequency signaling, and to transmit further radio frequency signaling to the apparatus;
wherein the apparatus further comprises:
a mesh networking chip set configured to establish a wireless mesh network comprising the apparatus and the one or more devices, wherein the wireless mesh network provides broadband Internet connectivity to the one or more devices:
a second receiver configured to receive the further radio frequency signaling from at least one of the one or more devices;
a second circuit configured to convert the further radio frequency signaling into further television white space signaling; and
a second transmitter configured to transmit the further television white space signaling to the source;
wherein the further television white space signaling is a backhaul for the wireless mesh network: and
wherein the system further comprises a transformer of a utility grid, and wherein the apparatus is further configured to monitor activities of the transformer,
wherein the apparatus is further configured to communicate with one or more utility meters associated with structures arranged in the utility grid, and to receive metered data relating to consumption of a utility from the one or more utility meters in the utility grid.

8. The system according to claim 7, wherein the first receiver and second transmitter of the apparatus comprise an antenna for wirelessly receiving the television white space signaling and transmitting the further television white space signaling.

9. The system according to claim 7, further comprising:
a central collection node configured to receive the television white space signaling from the source and transmit the television white space signaling to the apparatus, and further configured to receive the further television white space signaling from the apparatus and transmit the further television white space signaling to the source.

10. The system according to claim 9, wherein the first receiver and second transmitter comprise a connection port configured to receive a cable connected to the central collection node for receiving the television white space signaling and transmitting the further television white space signaling.

11. The system according to claim 7, wherein the one or more devices comprise one or more of a computer, laptop, tablet computer, and a mobile phone or device.

12. The system according to claim 7, wherein the wireless mesh network is formed comprising the apparatus and the one or more utility meters, and wherein the apparatus is a first node in the wireless mesh network and is configured to transmit the radio frequency signaling to the one or more utility meters serving as second or more nodes in the wireless mesh network for retransmission along the wireless mesh network to one or more other devices.

13. The system according to claim 12, wherein the one or more other devices further comprise one or more of a computer, laptop, tablet computer, and a mobile phone or device, and the wireless mesh network provides the Internet connectivity to the one or more other devices.

14. The system according to claim 13, wherein the one or more other devices are configured to receive and transmit signaling that is independent from the utility grid through the wireless mesh network.

* * * * *